(12) United States Patent
Kim et al.

(10) Patent No.: US 9,074,893 B2
(45) Date of Patent: Jul. 7, 2015

(54) METHOD FOR PROVIDING A CUSTOM MAP VIA AN INFORMATION BLOCK

(76) Inventors: Won Tae Kim, Seoul (KR); Myoung Jin Shin, Seoul (KR); Kwang Jin Oh, Seoul (KR); Hee Man Park, Seoul (KR); Myoung Se Kim, Seoul (KR)

(*) Notice: Subject to any disclaimer, the term of this patent is extended or adjusted under 35 U.S.C. 154(b) by 41 days.

(21) Appl. No.: 13/879,777

(22) PCT Filed: Oct. 28, 2011

(86) PCT No.: PCT/KR2011/008107
§ 371 (c)(1),
(2), (4) Date: Apr. 16, 2013

(87) PCT Pub. No.: WO2012/064036
PCT Pub. Date: May 18, 2012

(65) Prior Publication Data
US 2013/0218454 A1    Aug. 22, 2013

(30) Foreign Application Priority Data
Nov. 12, 2010 (KR) .................. 10-2010-0112796

(51) Int. Cl.
*G01C 21/32* (2006.01)
*G01C 21/00* (2006.01)
*G01C 21/36* (2006.01)

(52) U.S. Cl.
CPC .............. *G01C 21/00* (2013.01); *G01C 21/367* (2013.01)

(58) Field of Classification Search
CPC ...... G01C 21/00; G01C 21/367; G01C 21/26; G01C 21/28; G01C 21/30; G01C 21/32; G01C 21/36; G01C 21/3667; G01C 21/3682; G01C 21/3694
USPC ......... 701/410, 454, 455, 421, 430, 432, 451, 701/452
See application file for complete search history.

(56) References Cited

U.S. PATENT DOCUMENTS

| | | | |
|---|---|---|---|
| 6,144,920 A * | 11/2000 | Mikame .................. | 701/455 |
| 6,792,349 B1 * | 9/2004 | Chen et al. ................ | 701/410 |
| 2005/0270311 A1 * | 12/2005 | Rasmussen et al. ........ | 345/677 |
| 2007/0282526 A1 * | 12/2007 | Smith ...................... | 701/211 |
| 2008/0155027 A1 * | 6/2008 | Martin et al. ............. | 709/206 |
| 2009/0085774 A1 * | 4/2009 | Yasuhara et al. .......... | 340/933 |

FOREIGN PATENT DOCUMENTS

| | | |
|---|---|---|
| KR | 10-2005-0104134 | 11/2005 |
| KR | 10-2006-0037494 | 5/2006 |
| KR | 10-2006-0119576 | 11/2006 |
| KR | 10-2007-0084827 | 8/2007 |

* cited by examiner

*Primary Examiner* — Stephen Holwerda
(74) *Attorney, Agent, or Firm* — John K. Park; Park Law Firm

(57) ABSTRACT

A method for providing specific region information using a user terminal in a wired/wireless network environment is provided, and more particularly, a method for providing a custom map via an information block, which involves providing region information to an individual user using an optimally customized method such that the region information may be easily utilized, is provided.

6 Claims, 7 Drawing Sheets

METHOD FOR PROVIDING A CUSTOM MAP VIA AN INFORMATION BLOCK

TECHNICAL FIELD

The present invention relates to a method of providing specific regional information using a user terminal in a wired/wireless network environment and, more particularly, to a method of providing a customized map via information blocks that provides regional information using a method optimally customized for an individual user, thereby enabling the regional information to be easily utilized.

BACKGROUND ART

With the advancement of wired/wireless networks and with the development of mobile terminals, such as PDAs and smart phones, it becomes possible to, while moving, connect to a network and use various types of information and services. In particular, as travelling and leisure lives become more prevalent, a demand for regional information, including route guidance, is rapidly increasing.

Regional information currently served via a mobile terminal is generally configured such that regional information requested by a user is displayed to allow its location to be indicated on an actual map screen and, in order to obtain more detailed information, the user selects the regional information indicated on a map and then receives and uses the detailed regional information.

However, in a map environment in which roads, buildings and facilities are complicatedly mixed, like that of a city, a plurality of pieces of regional information are provided at the same time, and thus difficulties arise in that users are confused about the use of the regional information and must select desired information, which is prominent, particularly in the case of a mobile terminal.

That is, since a mobile terminal has a narrow screen and relatively low-speed hardware because of its intrinsic characteristic that it should be suitable for mobility and is used in a relatively low-speed network environment, there occurs difficulty obtaining desired regional information when regional information is provided in a relative inefficient manner, as described above.

DISCLOSURE

Technical Problem

The present invention has been made keeping in mind the above problems occurring in the prior art, and an object of the present invention is to provide a method of providing a customized map via information blocks that provides regional information using a method that is optimally customized for an individual user, thereby enabling the regional information to be easily utilized.

Technical Solution

In order to accomplish the above object, the present invention provides a method of providing a customized map via information blocks, the method providing geographical information-based regional information to a user terminal connected to a regional information provision system over a network, the method including the step of receiving regional information generated with respect to a specific region from the provision system in response to a request from a user and then displaying the received regional information on the user terminal as personalized regional information, wherein the step of displaying the received regional information on the user terminal as personalized regional information includes the step of computing the real-time location of the user, and the step of computing the direction and distance of the personalized regional information based on the real-time location of the user and then determining and displaying a location of the regional information based on the relative directions and distances of a plurality of pieces of regional information in a regional information frame disposed in a honeycomb arrangement and previously displayed, and thus the personalized regional information is displayed in a hexagonal shape around the real-time location of the user terminal in a honeycomb-shaped regional information frame based on the relative directions and distances of the plurality of pieces of regional information, thereby providing the customized map and thus enabling the regional information to be easily utilized.

Advantageous Effects

According to the method of providing a customized map via information blocks in accordance with the present invention, a user can intuitively check and select regional information efficiently represented by an information block, and continuously manage and edit his or her own personalized regional information, thereby achieving the effect of easily utilizing regional information.

Furthermore, the present invention is not confined to a closed regional information provision service, but operates in conjunction with various other applications that utilize regional information, thereby achieving the effect of providing a base on which a user's own personalized regional information can be built three-dimensionally. As a result, the effects of enabling regional information to be shared among users via Twitter and improving the chances of personal exchanges are provided, and thus the advantage of allowing users to realize broader social networks can be achieved.

MODE FOR INVENTION

Figure 1:
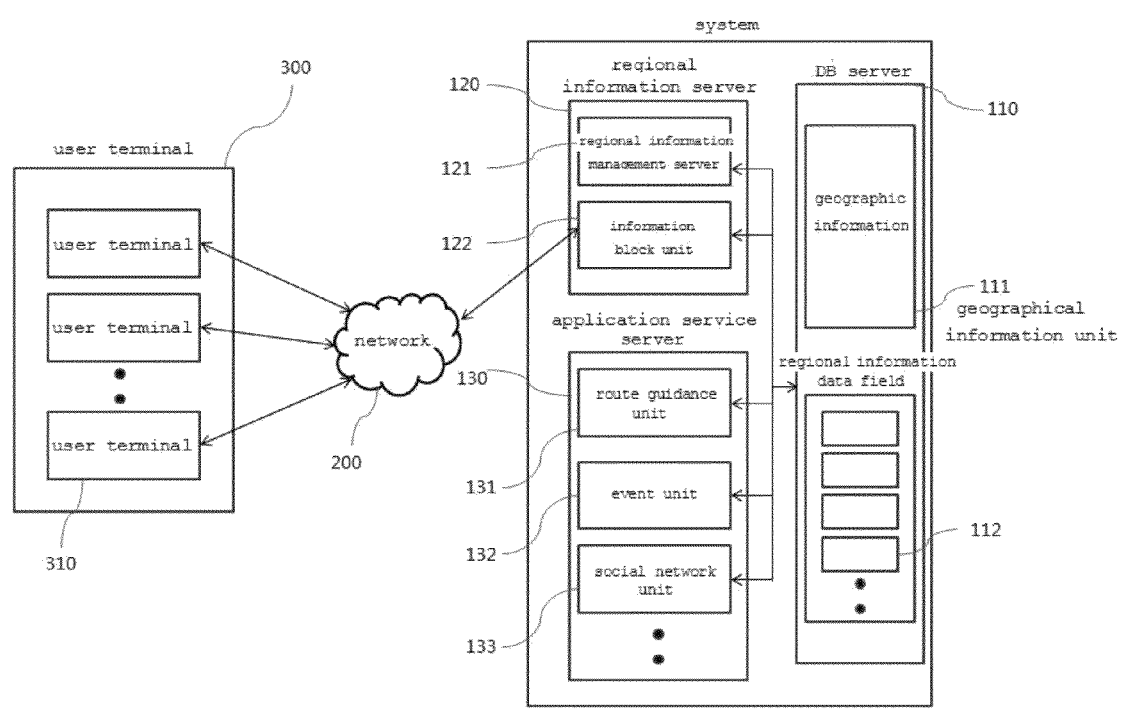
FIG. 1 is a diagram illustrating a configuration in which a system that enables a method of providing a customized map via information blocks in accordance with the present invention is connected over a network.

First, a method of providing a customized map via information blocks in accordance with the present invention is provided when each user connects with a regional information provision system over a wired/wireless network 200 using his or her terminal 300 or 310. Here, the regional information provision system is configured as an example, as illustrated in FIG. 1 and as described below.

That is, the system includes a DB server 110, a regional information server 120, and an application service server 130. The DB server 110 includes a geographical information unit 111 configured to store basic geographical information on per-name, per-telephone number and per-place name bases and provide basic data that is used to generate regional information, and a regional information data field configured to store regional information for specific regions, which is generated in response to requests from users. In the data field, personalized data fields 112 that have been personalized in response to requests from the users are stored while forming a separate folder.

The regional information server 120 includes an information block unit 122 configured to process personalized regional information in the form of information blocks and perform rearrangement based on each user's real-time location while taking into consideration relative locations and distances between the information blocks, and a regional information management unit 121 configured to provide the information blocks and additional regional information to the user terminals in response to requests from the users and be responsible for connections to application services in response to additional requests.

The application service server 130 includes a route guidance unit 131 configured to, in response to a request from each user, run a separate application service associated with a map service in response to a request from each user, offer necessary support, and provide guidance from the current location of a corresponding user terminal to a selected destination as a representative function, an event unit 132 configured to provide information about advertisements, events, and discounts within the regional information to the user terminal, and a social networking unit 133 configured to operate in conjunction with a social network service such as Twitter. However, it will be apparent that the method of providing a customized map in accordance with the present invention can additionally work in conjunction with any service that utilizes regional information.

Details of the method of providing a customized map via information blocks, which is the core of the present invention, will be described below.

The present invention is intended to enable each user to intuitively utilize only his or her own personalized unique regional information when he or she utilizes various geographical information-based regional information using his or her terminal. For this purpose, only essential regional information is displayed on a screen based on the concept of an information block, and thus all unnecessary regional information can be excluded.

Figure 2:
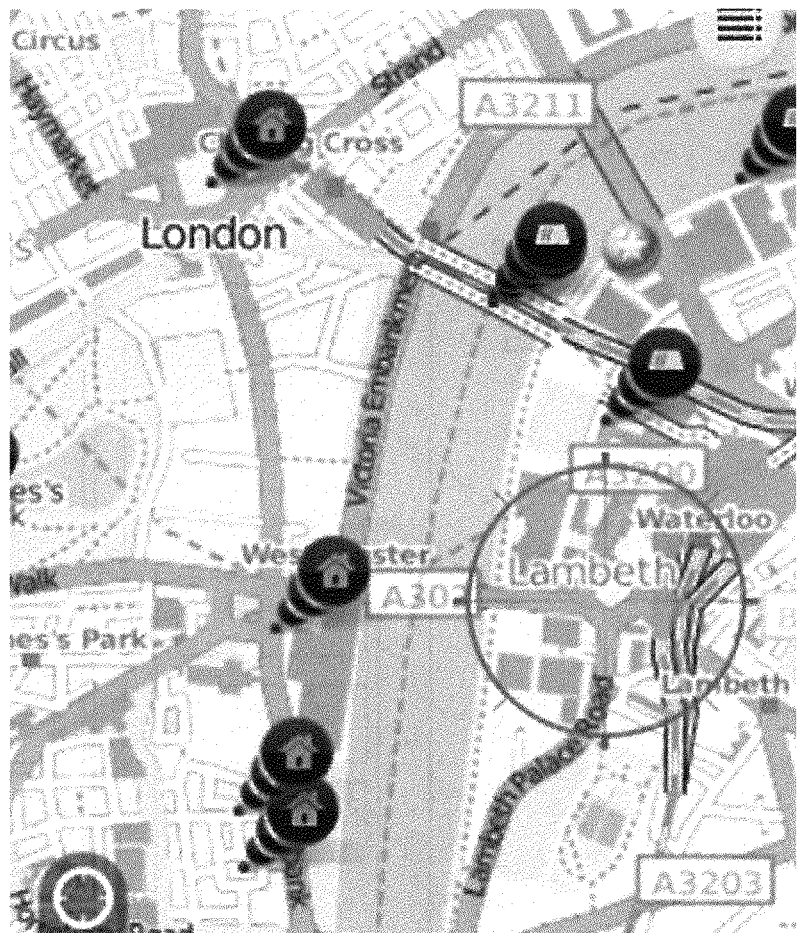
FIG. 2 is a screen illustrating the conventional provision of regional information using a map.

Here, the regional information may be a place at a specific address, may correspond to the concept of a specific place of business, or may be a place where a specific person is present, and thus takes various forms. If such regional information is indicated on a typical map, it is indicated in the form of a single dot based on actual geographical information, as illustrated in FIG. 2.

Although such actual geographical information may be helpful to the determination of the absolute location of specific regional information, it may be rather an obstacle to the determination of truly necessary regional information in a portable terminal environment, and thus it is rather preferable to exclude the actual geographical information and provide only the necessary information.

For this purpose, the present invention is characterized by displaying only personalized regional information selected by each user and personalized in the form of a kind of favorites on a screen while excluding all other regional information, the regional information being represented by a standardized information block having a predetermined area, other than a simple dot, thereby enabling the user to utilize the regional information as the concept of an "important place" rather than a "specific spot on a map."

Here, the information block may be standardized in various shapes, such as a circular shape, a rectangular shape, a star shape or a specific figure shape. However, in this embodiment, an example in which information blocks have hexagonal shapes capable of appropriately and efficiently representing the relative locations of a specific region and are all arranged in a honeycomb form is illustrated, as depicted in FIG. 3.

Figure 3:
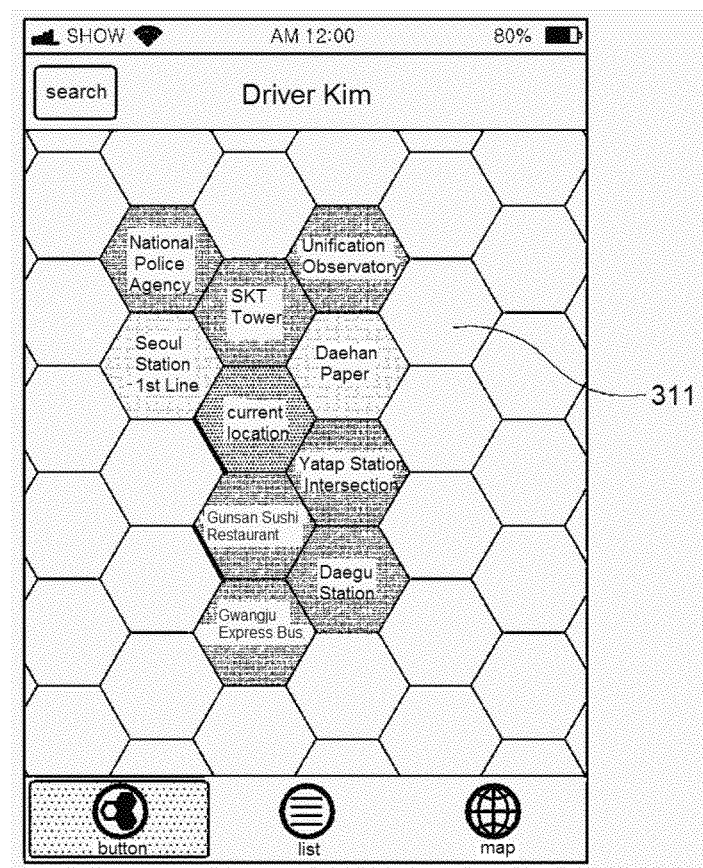
FIG. 3 is a screen illustrating the provision of regional information using a method in accordance with the present invention.

Referring to FIG. 3, the characteristics of regional information that is provided in according with the present invention and displayed on the user terminal will be described in greater detail. Pieces of personalized regional information are represented by respective hexagonal information blocks, and are located and indicated at relative locations around the real-time location of the user on a regional information frame 311 that is previously disposed and displayed on a screen in a honeycomb form.

Here, the personalized regional information is specific regional information that is stored in a personalized data field assigned to each user and then provided to a user terminal in response to each request. In a process in which specific regional information is stored in a personalized data field, for example, the specific regional information may be automatically added to the personalized data field in such a way that a user searches for an address or a name, a specific place may be intentionally added to the personalized data field in the form of favorites, and the specific regional information may be forcibly added to the personalized data field by another person's recommendation. Alternatively, it will be apparent that such regional information may be excluded by deleting it from the personalized data field through a user's selection.

Figure 4:
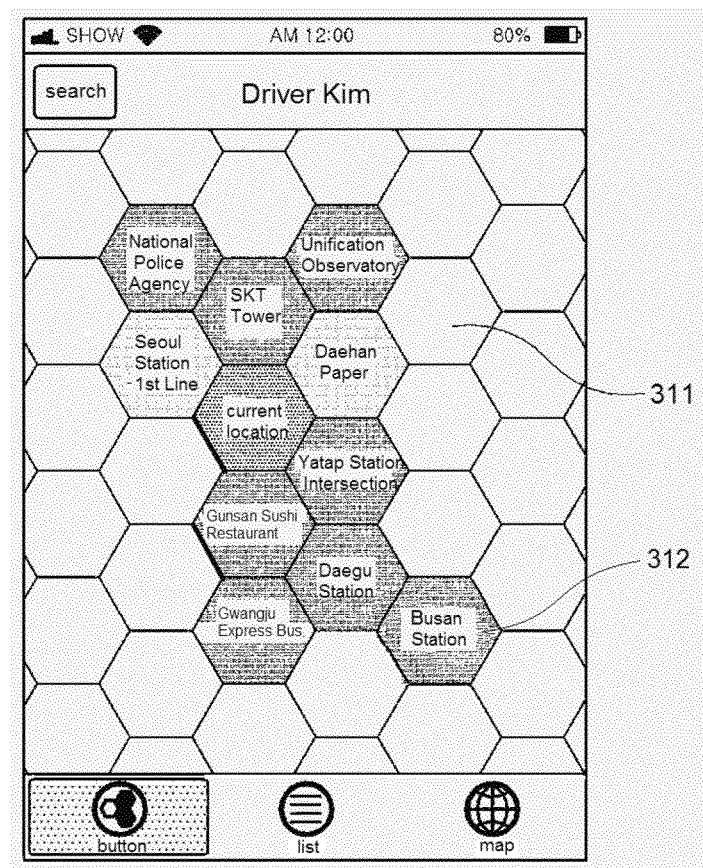
FIG. 4 is a screen illustrating the addition of a new information block to FIG. 3.

As a result, as an example, when a user resides in Seoul, regional information related to Seoul is chiefly obtained as personalized regional information, and only stations and express bus terminals, which are key points of metropolitan cities, are additionally used as principal regional information. When Busan Station has been additionally searched for, an information block regional information frame 312 for Busan Station is added, as illustrated in FIG. 4, and therefore his or her own customized regional information may be obtained.

Meanwhile, as described above, in the present invention, a user's use is further facilitated by efficiently displaying only regional information actually required by the user regardless of actual physical distances. This clearly contrasts with the fact that it is absolutely impossible in a typical map service to easily view information at a glance because all regional information must be indicated in scale.

Furthermore, when regional information is indicated using information blocks in accordance with the present invention, the relative directions and distances of places are computed around the real-time location of the user, and then the regional information is displayed on the user's screen. The process of computing the user's real-time location and the process of computing the direction and distance of each piece of personalized regional information relative to the user's real-time location and locating and indicating the personalized regional information in a regional information frame arranged in a honeycomb form and previously displayed based on the relative direction and distances of a plurality of pieces of regional information are performed. The regional information is displayed on the user's screen. Whenever a change in the user's location occurs, it is incorporated thereinto. Accordingly, the user can always maintain a spatial sensation regarding the personalized regional information around his or her location.

Meanwhile, the method of providing a customized map in the present invention does not provide a closed isolated service, but operates in conjunction with other services that utilize regional information. Accordingly, the method of providing a customized map in accordance with the present invention may be used as a gate interface that enables easy access to all map-related services upon receiving the services.

Figure 5:
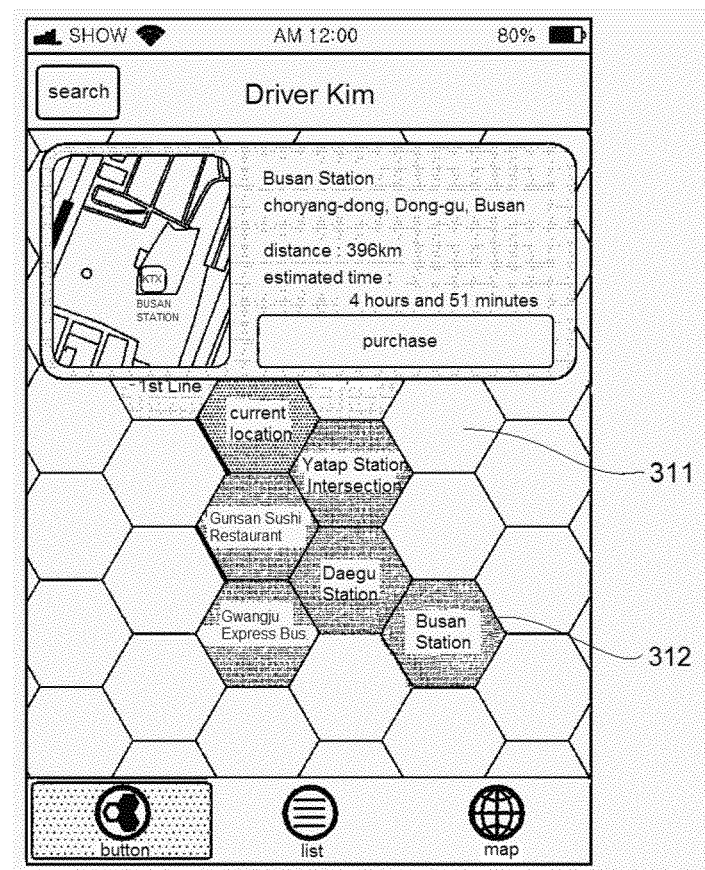
FIGS. 5 and 6 are screens illustrating the operation of the method in accordance with the present invention in conjunction with a route guidance application service.
Figure 6:
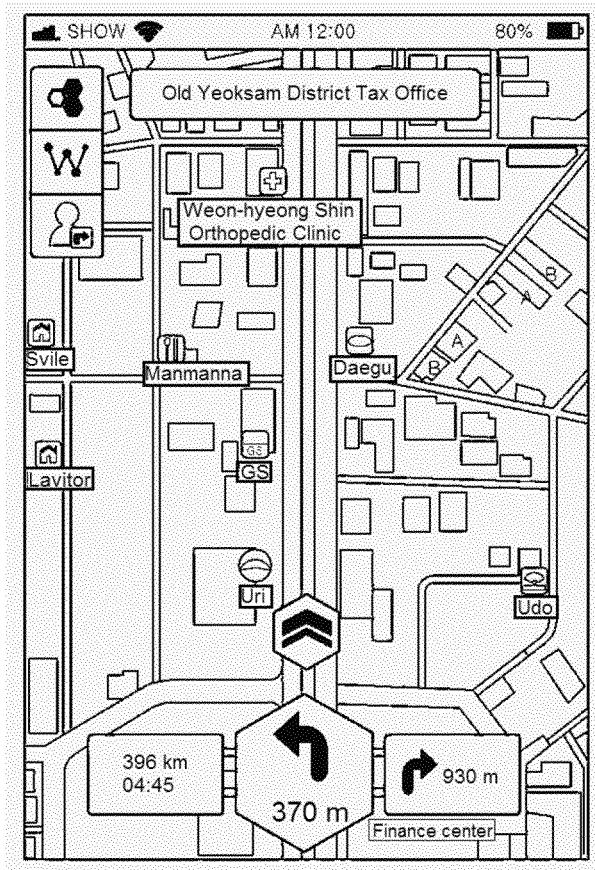

This becomes possible when regional information services, including the service of the present invention, share geographical location-related data in a terminal as an open source. As a representative example, when a route finding service is provided via a user's terminal, a route guidance service can be more easily utilized via the present invention, which will be described in detail with reference to FIGS. 5 and 6.

That is, when the user desires to search for Busan Station in personalized regional information represented by information blocks in accordance with the present invention, a route guidance service regarding Busan Station is initiated by simply selecting an information block related to Busan Station without performing a complicated search or using an interface for a route finding service.

In this case, it is preferable to allow whether to enter the full-fledged route guidance service and use route guidance to be determined by presenting rough route guidance information, such as distance and estimated time, before entering the full-fledged route guidance service.

Although an information block displayed on the user's screen in accordance with the present invention is generally labeled with the name of a corresponding place, the labeling is not necessarily limited thereto, and the name may be represented along with various types of additional information, thereby being able to provide various additional applications.

Figure 7:
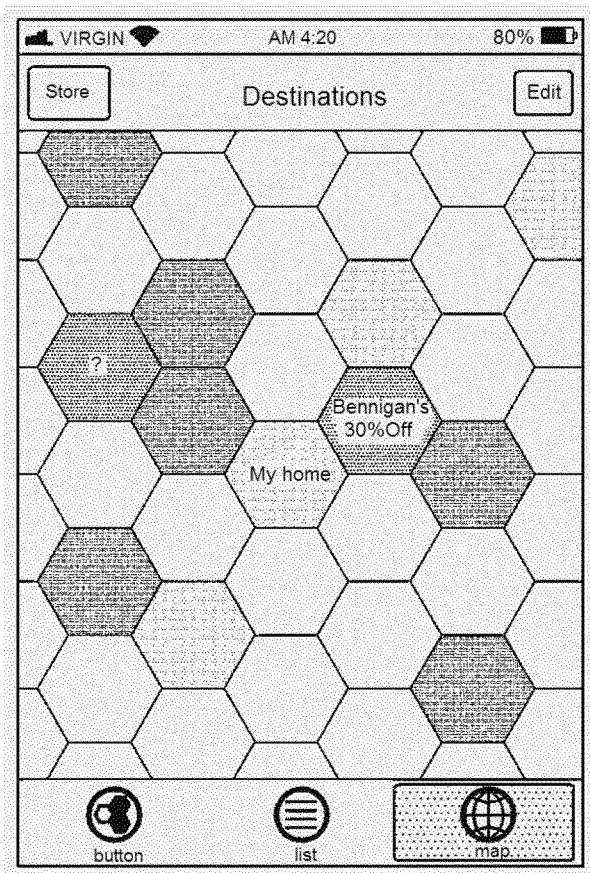
FIG. 7 is a screen illustrating an information block that includes additional information when regional information is provided in accordance with the present invention.

That is, if a user has personalized regional information with respect to the business name "Bennigan's," the user is made to easily become aware of information and select it by displaying a temporary 30% discount event along with the name of the information block, that is, "Bennigan's," while presenting the temporary 30% discount event, as illustrated in FIG. 7, thereby enabling the user to easily accept the event information.

Here, when "Bennigan's" has a plurality of affiliate shops at a plurality of places in an affiliation manner, it is preferable to display only an affiliate shop currently closest to the user on the user's screen rather than displaying all information blocks on the screen, thereby allowing the user to easily visit the affiliate shop.

As described above, the present invention does not provide regional information merely to promote the user's convenience in the checking of the regional information, but enables commercial activities, thereby providing additional benefits. If such additional information is not necessary, the additional information may be made not to be included in the user's personalized regional information any longer by deleting the additional information from the personalized regional information, thereby being able to minimize the user's repulsion.

Meanwhile, regional information displayed on the user's screen in the form of an information block may be added to personalized regional information in such a way that the user searches for an address or a name, or may be intentionally added via content including geographical information.

As a representative example, an information block may be added based on photo content that is stored in a user terminal and includes geographical information. In greater detail, an information block represented in the form of a photo may be added by designating the photo stored in the user's terminal using an information block addition option or by newly capturing, storing and selecting a photo, in which case a location relative to the user is displayed on the screen based on geographical information related to the capturing of the photo.

Alternatively, an information block may be added via an open source social network service, representative examples of which are "Twitter," "Foursquare," and "Gowalla." As an example, the regional information "Flamingo Cantina" is added to personalized regional information by selecting the regional information "Flamingo Cantina" in which geographical information has been included by the user or another person and which has been registered by the user or the other person during the use of a social network service, thereby allowing the user to utilize the regional information.

Moreover, when the present invention operates in conjunction with a social network as described above, the fixed or real-time location of another user may be represented by an information block that is displayed on the user's screen in accordance with the present invention.

When an information block displayed on a user's screen in accordance with the present invention indicates the user as described above, it is possible to very easily transfer information to the user via transfer between information blocks.

For example, when an information block displayed on each user's screen is dragged and dropped into another user's information block, additional information associated with the original information block—my real-time location information, destination information for route guidance to a specific location, the event information of a specific business place, or the multimedia information of a specific place—is registered in the data field of the counterparty, and the corresponding user may easily check the corresponding additional information through selection as the transferred information block is displayed on his or her own screen.

That is, since the present invention is characterized by optimally and efficiently providing only necessary regional information essential for each user—including the user's location information—it is possible to easily check and easily utilize regional information that is considered to be important by himself or herself.

Meanwhile, personalized regional information stored in a separate personalized data field for each user as described above may be provided as an open source so that other users can check the content of the personalized regional information via searches.

As an example, when "Flamingo Cantina" is added as personalized regional information and then changed to the name "place where good music can be heard" to classify a place for each individual, the corresponding regional information is provided when another user searches for the "place where good music can be heard," and thus it can be searched for using an attribute or other characteristics even when a search is not performed using "Flamingo Cantina," thereby achieving the effect of improving search quality.

As discussed above, according to the present invention method of providing a customized map via information blocks, each user can easily and intuitively become aware of and very easily utilize and manage only necessary regional information.

Moreover, the present invention is not simply confined to a single application service, but may operate in conjunction with other application services that utilize map information and be used as a gate interface for the services. The present invention is very significant in the sense that an individual can easily utilize all important information in connection with map information in an integrated manner and the present invention can be utilized in commercial activities and social networks in various ways.

The invention claimed is:

1. A method of providing a customized map via information blocks, the method providing the customized map based on geographical information to a user terminal connected to a regional information provision system over a network, the method comprising:

the step of receiving regional information generated with respect to a specific region from the provision system in response to a request from a user and then displaying the received regional information on the user terminal as personalized regional information, wherein the step of displaying the received regional information on the user terminal as personalized regional information comprises:

the step of computing a real-time location of the user, and the step of computing a direction and distance of the personalized regional information based on the real-time location of the user and then determining and displaying locations of the regional information based on relative directions and distances of a plurality of pieces of regional information in a regional information frame disposed in a honeycomb arrangement and previously displayed, and thus the personalized regional information is displayed in a hexagonal shape around the real-time location of the user terminal in horizontal, vertical, and diagonal directions in a honeycomb-shaped regional information frame based on the relative directions and distances of the plurality of pieces of regional information, thereby, whenever a change in the user's location occurs, providing the customized map reflecting the change in the user's location and thus enabling the regional information according to the real-time location of the user to be easily utilized.

2. The method of claim 1, further comprising the step of, when selecting a specific information block from among the information blocks, operating in conjunction with a route guidance mode that guides the user from the real-time location to corresponding regional information.

3. The method of claim 1, wherein a specific one of the information blocks displays additional information related to corresponding regional information, and thus the additional information is provided by selecting the specific information block.

4. The method of claim 1, further comprising the step of, with respect to the regional information related to the specific region that is distributed in a plurality of regions, extracting and providing only regional information closest to the real-time location of the user terminal.

5. The method of claim 1, wherein the regional information related to the specific region is related to another user's current location information, and the other user's location information is received in conjunction with a social network service or telephone number information.

6. The method of claim 5, wherein, when one of the information blocks is dragged and dropped into another user's information block related to location information, regional information of the former information block is provided to the other user and, simultaneously, the corresponding regional information is added to a personalized data field of the other user.

* * * * *